Figure 2A:
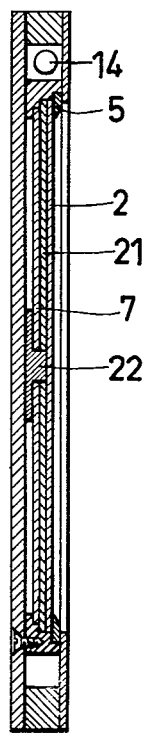

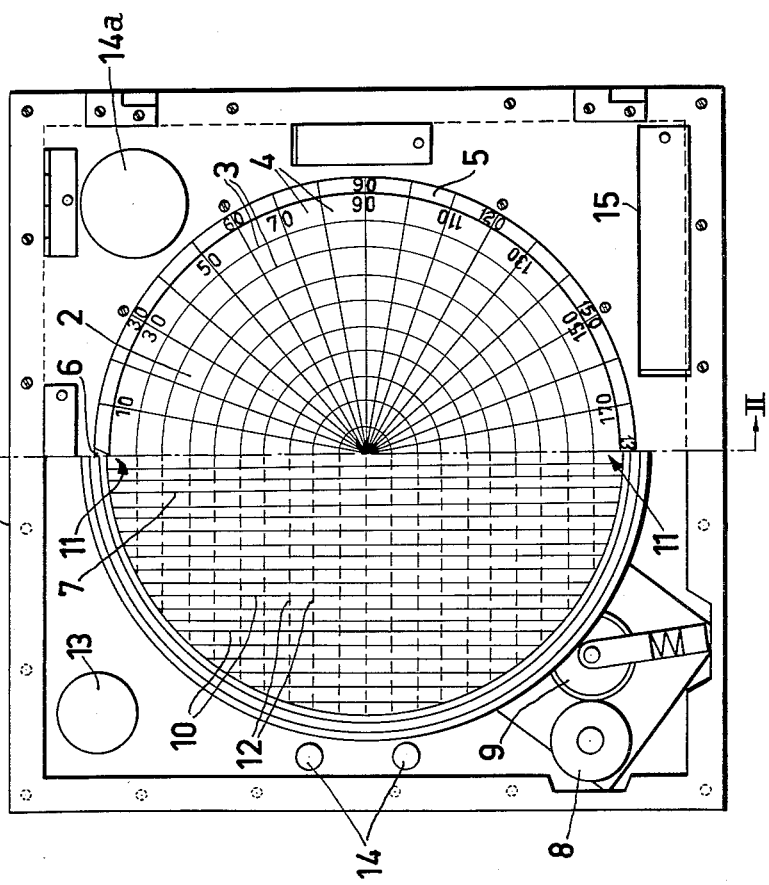

April 18, 1961

G. A. TENGWALL 2,979,821

PLOTTING DEVICE INTENDED FOR CONTINUOUS ANALYSIS
OF RADAR INDICATIONS ABOARD SHIPS

Filed July 26, 1957

4 Sheets-Sheet 4

Inventor
G. A. Tengwall

United States Patent Office

2,979,821
Patented Apr. 18, 1961

2,979,821

PLOTTING DEVICE INTENDED FOR CONTINUOUS ANALYSIS OF RADAR INDICATIONS ABOARD SHIPS

Göran A. Tengwall, Riksradsvagen 60, Johanneshov, Sweden

Filed July 26, 1957, Ser. No. 674,499

Claims priority, application Sweden Aug. 7, 1956

3 Claims. (Cl. 33—1)

The present invention relates to a plotting device intended for continuous analysis of radar indications aboard ships, with plotting disc, spider web diagram and a movable bearing ring.

As a result of the great development within the field of navigation, that supplement to the radar equipment, that the plotting constitutes, has become a necessary instrument for rendering safe traffic at sea. By means of the plotting devices hitherto used for this purpose the navigator, after transposition of radar indications emanating from another ship to a plotting disc provided with spider web diagram and bearing ring, through geometric constructions combined with systematic calculations, can state the heading and the speed of the other ship, and also, through geometrical constructions, plan suitable evasive navigation when there is risk of collision.

As it is of the greatest importance that all data necessary for the evasive navigation, as also the character change of heading or/and speed of the evasive navigation itself, must be established in a minimum of time, it is obvious what disadvantages the present system with its timewasting calculations are subject to. As a result of the relatively long time used for the construction with regard to the plotting devices, both ships have had time to change their positions before the evasive manoeuvre has been established. For this reason it has been necessary to plan the evasive manoeuvre upon basis of precalculations corresponding to the time of construction, supposing unchanged data as to speed and heading as far as both ships are concerned. It is evident that manoeuvres based upon such uncertain factors can be extremely fatal, for example if the other ship, through its own radar observations has decided upon and changed speed or heading. Likewise there is a great risk that the navigator in critical situations is forced to press the work of construction, so that the result will be insufficiently exact or entirely misleading.

Through the present invention the work of construction is eliminated and the work of plotting is reduced to such a degree that the time necessary therefor can be neglected insofar that an evasive manoeuvre can be carried out without considering changes, if any, in the conditions of speed and heading of one of the ships in accordance with the latest radar indications upon which the plotting is based. The invention is substantially characterized by an operating disc coaxial with a plotting disc and diagram and movable in relation to them, the face of the said operating disc being divided into a large number of alignment fields of equal width in order to make a parallel displacement of a given or chosen straight line on the plotting disc or the diagram to a desired place thereon, besides which the alignment field or the line going through the centre of the operating disc respectively displays end markings cooperating with the peripheral graduation of the diagram for indicating the angular position of the straight line in the diagram.

Figure 2B:
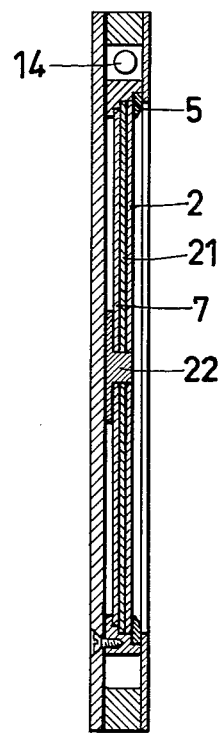
Figure 3:
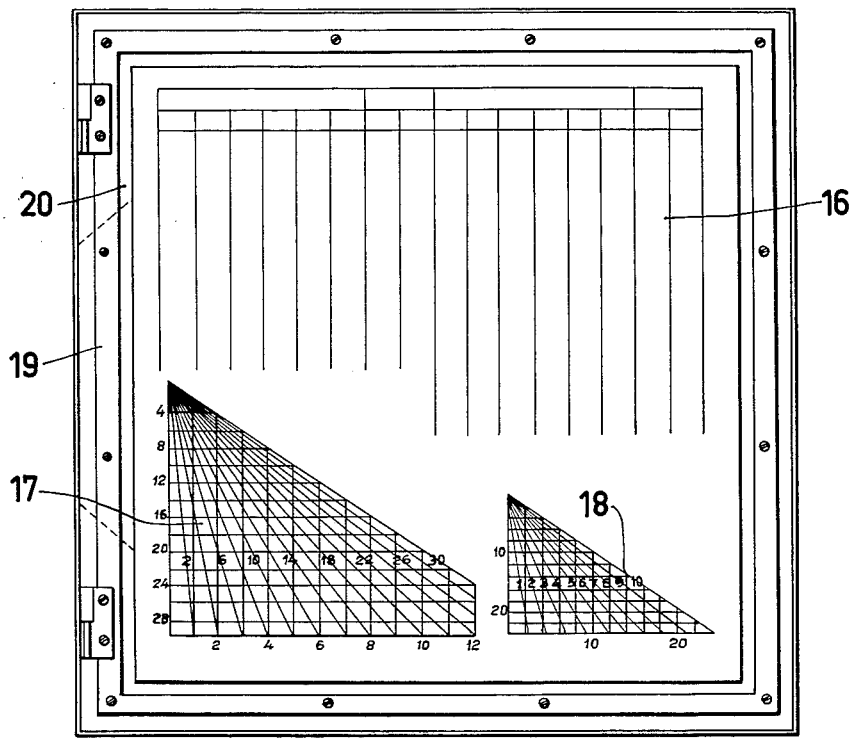
Figure 4:
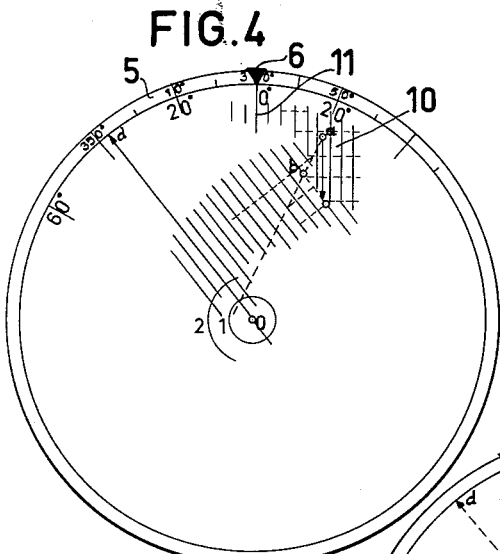
Figure 5:
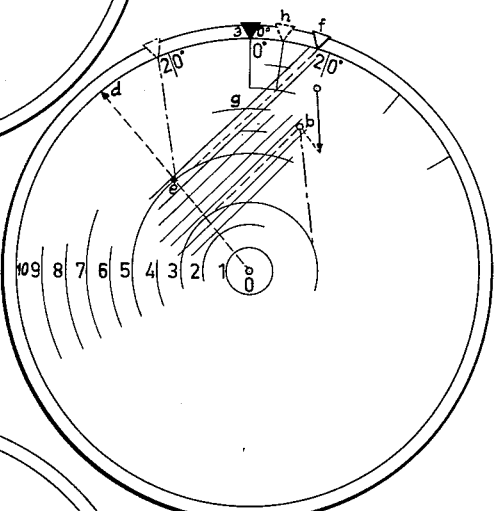
Figure 6:
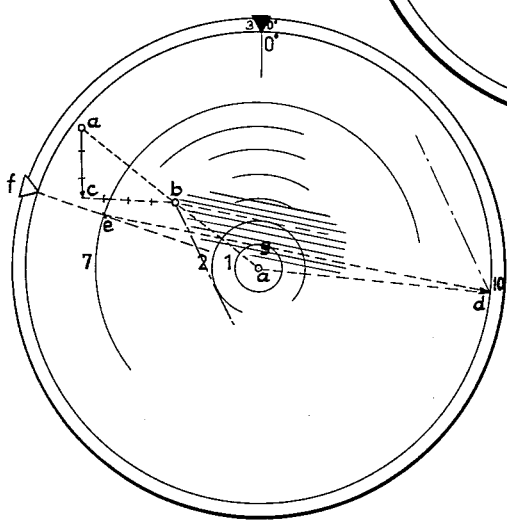

The invention will be described in detail with reference to the accompanying drawings in which Fig. 1 shows a plan view of a special embodiment of the plotting device according to the invention, the left-hand half of the upper portion being omitted. Fig. 2 shows a cross section along the line II—II in Fig. 1. Figs. 2a and 2b are cross-sections analogous with Fig. 2 representing two modifications, respectively, of the disc arrangement. Fig. 3 shows a lid making part of the device with note sheet and chart for establishing data as to speed and heading, and Figs. 4, 5 and 6 are typical examples of the use of the plotting device in various cases.

To begin with, the structure of the device will be described. In a plate 1, which is substantially square and preferably is of Bakelite or some other plastic material, a transparent, circular plotting disc 2 is attached. In this case the disc also serves as spider web diagram, for which purpose it is graduated in ten distance circles 3 the division corresponding for example to a nautical mile and in angle sectors 4, each being for example 10° with markings 0–180° in both directions from the reference line between the first and the second quadrant with the quadrants being counted counter-clockwise from the right horizontal axis of the diagram, as seen from the observer. The disc 2 is confined by a bearing ring 5, coaxially turnable around the disc and graduated from 0 to 360°, which can be adjusted in relation to the fixed index arrow 6 for indicating the heading of the ship. Immediately below the plotting disc 2 and coaxial therewith an operating disc 7, for example of plastic, is mounted, which can be turned by means of a knob 8 via a wheel 9, for example of acid-proof hard rubber, abutting against the periphery of the disc 7. The face of the operating disc 7 is divided into a large number of alignment fields 10, the field going through the centre of the disc being formed with an arrow 11 at each end. The alignment fields 10 are intersected at right angles by interparallel dashed distance lines 12 with the same division as the distance circles 3 of the plotting disc 2. The plate 1 is preferably provided with built-in illumination 14, controlled by a rheostat 13, which, in addition to the plotting disc 2, also illuminates a watch with short-timer, shown at 14a, which can be set so as to give signals, for example at intervals of two, four or six minutes. A pencil box 15 is shown at the lower portion of the plate. The plate is also provided with a shuttable and detachable lid (Fig. 3) the inside of which is provided with a note form 16 together with a speed-time chart 17 and a speed ratio chart 18 which are illuminated via slot 19 in the edge of the lid. A tightening ring 20, for example of oil-hardened rubber, is laid-in in the edge portion of the lid.

In the embodiment shown all means necessary for the navigator are conveniently available, which greatly facilitates the plotting operation. This, in combination with the built-in illumination renders it possible for the navigator to be constantly near the radar screen in the pilot house without, as was earlier the case, alternating between the pilot house which is dark at night and the illuminated navigation house with resulting loss of time and difficulties of getting used to light and dark.

The plotting device described above can be used for determining quickly and conveniently with geometric work of construction:

(A) Heading and speed of another craft (hereinafter called target), (B) Risk of collision, (C) Change of heading or speed of one's own ship in order to pass the target at a certain distance or in order to assume a certain position in relation to the target.

The different moments are explained through direct examples in connection with the diagrammatic Figures 4–6.

*Operations A.*—Suppose, in accordance with Fig. 4, that one's own heading is 30°, as shown by the bearing ring 5 and the fixed index 6. Further it is supposed that one's own speed is 14 knots and that two radar indications from the target at an echo interval of 12 minutes have been pricked-in on the plotting disc at a and b respectively. The centre 0 of the disc of course corresponds to the position of one's own ship. The operating disc is turned until the arrow 11 of its middle field points towards the fixed index 6, after which the distance one's own ship has covered during the echo interval is taken from the speed-time chart 17 in Fig. 3, and is indicated by means of the corresponding alignment field 10 downwards from the first echo marking a. The end point of the distance is indicated for example by an arrow c. Thereafter the operating disc is turned until one of the alignment fields 10 runs through the two points a and c, the heading of the target being indicated by the diametral arrow d to be, as in this case, a true bearing of about 350° and a relative bearing of about 40° larboard which heading is marked for example by an arrow. The speed of the target is obtained by marking the distance c—b covered during the echo interval in the speed-time chart 17, the speed of the target being about 7 knots.

*Operations B.*—The risk of collision can be judged immediately by turning the operating disc until an alignment field runs through the two echo points a and b. It can be stated immediately that at unchanged conditions of heading and speed of one's own ship as well as of the target, these, in this case, will pass within a distance from each other of a nautical mile, which can be seen from the intersection of the alignment field with the distance circle indicated by "1." However, the distance should be at least two nautical miles, and therefore it is necessary to make an evasive manoeuvre by changing heading and/or speed.

*Operations C.*—In connection with the previous example it is supposed that one wishes to pass at three nautical miles from the target. For this purpose the speed ratio of the ships is first determined, which, according to the invention, is defined as the quotient between the lowest and the highest speed, in this case 7/14=0.5, which value can be read from the speed ratio chart 18 in Fig. 3. The distance circles in the spider web diagram are also intended for indicating the place for the speed ratio, the inner circle (see Fig. 5) having the value 0.1 and the outer one the value 1.0 in conformity with the digits 1–10. If for example a veering to the starboard is desired, the operating disc is turned correspondingly in relation to the original heading until one of the alignment fields is tangent with the desired distance circle "3," at the same time as it runs through the latest echo point b. By following the parallel alignment field which goes from the intersection e of the heading radius o—d with the speed ratio circle "5" in question (properly 0.5) to the periphery in the direction of veering, the new heading (about 47°) is obtained at f, which heading ought to be maintained by one's own ship at unchanged speed in order that the ships may pass at a distance of three nautical miles from each other.

If instead one will change speed and maintain heading (30°) the new speed ratio is immediately obtained from the intersection g between the alignment field e—f and one's own heading radius, which speed ratio, which in this case is about 0.7, according to the chart 18 gives a reduction of the own speed to about 10 knots. If one desires to combine a certain starboard sheer with a certain reduction of speed, this can be easily carried out through corresponding choice of intersection between new heading radius and speed ratio circle anywhere on the line g—f. For example a small change of heading to h gives a speed ratio of 0.8, that is, a reduction of speed to about 9 knots. Thus, the whole distance e—f constitutes the geometrical place for all usable combinations of changes of speed and heading, the distance e—g corresponding to veerings to larboard, the speed being still more reduced.

By means of dash-and-dot lines such a case has been shown when a veering to larboard is desired instead of to starboard, the own speed being maintained. Such a process is completely analogous with that described just now.

Hitherto such a case has been treated when the speed of one's own ship exceeds that of the target. In Fig. 6 a case is shown when the speed of the target exceeds the speed of one's own ship, which is supposed to be unchanged, that is, 14 knots, the heading being unchanged, that is, 30°. By exactly the same principle as in Fig. 4 the heading of the target is established to the bearing indicated by the arrow d for the heading, which is marked, and it is also established that the distance c—b covered by the target according to the chart 17 gives a target speed of 20 knots. The line through a—b shows that there is risk of collision. According to the definition of the speed ratio a speed ratio of about 0.7 is obtained via the speed ratio diagram 18. As in this case, however, the speed of the target is higher than one's own speed, it will be necessary to proceed somewhat differently when determining the change of heading respectively speed of one's own ship. It is supposed that the target is allowed to pass at a distance of about two nautical miles. After having turned the operating disc, like in the preceding case, in such a manner that one of the alignment fields is tangent with the desired distance circle "2," at the same time as it runs through the latest echo marking b, one follows the parallel alignment field which goes from the arrow d for the heading when the speed ratio is 0.1 (or distance circle 10) to its intersection e with the deduced speed ratio circle 7 in the direction of steering away. The radius through o—e to the periphery then gives the new heading at f. As in the former case one can instead reduce the speed and maintain the heading, whereby the intersection g between the alignment field d—e and one's own heading radius for 30° gives a speed ratio of 0.1 corresponding to a reduction of speed to about 2 knots. Like before combinations between changes of speed and heading are, of course, possible, the distance e—g being the geometrical place.

By means of dash-and-dot lines it has been shown that it is not possible to turn to starboard and maintain the desired distance of passage of two nautical miles, as there will be no intersection between the line going from d and the speed ratio circle "7."

For the sake of simplicity it has hitherto been presumed that plotting disc and spider web diagram form a unit fixed to the plate with the reference line of the diagram in the direction of the stem of the ship. This supposition is sufficient for explaining in principle the use of the operating disc up to a change of heading and/or speed. However, it is evident that after change of heading of one's own ship the subsequent echo will be angularly displaced relatively to the preceding echo marking, with an angle corresponding to the change of heading, so that the plotting trace will become discontinuous. In order to obtain a continuous plotting trace, which is of great importance for the surveyability of the relative displacements of the ships, it is proposed according to the invention to make plotting disc and spider web diagram in two separate parts, which manually or from the compass of the ship are given a relative movement at change of heading. In principle there are two different possibilities: (A) The plotting disc 2 (Fig. 2a) is made as a unit fixed to the plate, while the web diagram disc 21 is made as a turnable unit, the bearing ring 5 being rigidly connected to the plotting disc 2. Thus, both the web diagram disc 21 and the operating disc 7 are separately rotatable around a common axis defined by the support pivot 22. (B) The web diagram disc 21 (Fig. 2b) is chosen as the fixed unit with the reference line in the direction of the stem of the ship, while the plotting disc 2 constitutes the turnable unit having the bearing ring 5 rigidly connected thereto and being rotatably mounted on the support pivot 22 indifferently of the operating disc 7.

Which of these two forms is most suitable in the actual case depends to a certain degree on the type of radar equipment used. However, in most cases the first form will involve that the direction of the stem of one's own ship will vary on the plot, whereby such a simple rule, that when determining the heading and speed of the target, the distance covered by one's own ship is marked downwards (compare Example 1) is no longer valid and the determination of data will be more difficult and thus more time-wasting.

The second form (*b*) implies a generic solution which always gives a direction of the stem upwards in the plot, at the same time as the plotting trace becomes continuous and gives a real picture of relative as well as true bearings.

From the above it will be seen that the navigator, without other extra means than a pencil, and possibly a compass leg fixed thereto, for more exact marking of distances in the speed-time chart by means of a few simple turnings of the operating disc in combination with read-off chart values, can determine all the necessary data for evasive manoeuvre within a minimum of time, often a fraction of a minute. Contary to the general method when it takes about 3 to 4 minutes to determine an evasive manoeuvre, which, at a relative speed of for example 20 knots, implies that the ships have approached each other more than a nautical mile, before the manoeuvre has been calculated, the ships will approach each other, when the present device is used, only a few hundred metres under otherwise the same conditions. It is evident that this gain of time is of very great importance for the safety, and that the evasive manoeuvre can be quickly modified, if a change in the movements of the other ship are discovered.

Owing to the fact that the work of plotting is reduced to a fraction of the time earlier required for this work, the navigator can to a great extent be otherwise occupied during the echo interval.

What I claim is:

1. A plotting device for continuous analysis of radar indications aboard ships comprising, in a frame, an uppermost plotting disc, a web diagram having a referential diameter line and applied on a disc, a bearing ring and an operating disc in mutual coaxial relation, the two upper ones of said three discs being transparent, said operating disc being rotatable relative to the plotting disc and diagram and its face being divided into a plurality of parallel alignment fields of equal width, the web diagram disc being mounted in movable relationship to said plotting disc and comprising a large number of sectorial alignment fields and ten concentric circles equally spaced and designated 1 to 10 from the origin and out to the periphery of said web diagram in order to define on one hand in tenths, the speed ratio factor, i.e. the quotient between the speed of the ship and a sighted object or vice versa, and on the other hand, nautical units from the origin, said parallel alignment fields and said sectorial alignment fields being cooperable with said speed ratio factor circles for obtaining a tangential or intersectional point therewith as base for determining the change of speed and/or heading required to obtain a new orientation relative to said object at a desired moment.

2. A device according to claim 1, wherein the plotting disc is fixed to the frame, the bearing ring being rigidly connected to the plotting disc and the web diagram is rotatably mounted in the frame.

3. A device in accordance with claim 1, in which the web diagram disc is fixed to the frame of the device with the reference line of the diagram oriented in the direction of the stem of the ship, the plotting disc comprising a rotatable unit on which the bearing ring is rigidly mounted.

References Cited in the file of this patent
UNITED STATES PATENTS

| | | |
|---|---|---|
| 2,485,674 | Suiter | Oct. 25, 1949 |
| 2,717,448 | Lubin et al. | Sept. 13, 1955 |
| 2,813,338 | Meyers | Nov. 19, 1957 |

FOREIGN PATENTS

| | | |
|---|---|---|
| 701,932 | Great Britain | Jan. 6, 1954 |